(12) United States Patent
Kim et al.

(10) Patent No.: US 6,707,511 B2
(45) Date of Patent: Mar. 16, 2004

(54) REFLECTIVE AND TRANSFLECTIVE LIQUID CRYSTAL DISPLAY DEVICE AND ITS MANUFACTURING METHOD

(75) Inventors: Dong Guk Kim, Kangseo-gu (KR); Woong Kwon Kim, Kunpo-shi (KR); Kyoung Su Ha, Seoul (KR); Heume Il Baek, Seoul (KR); Yong Beom Kim, Suwon-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/893,557

(22) Filed: Jun. 29, 2001

(65) Prior Publication Data

US 2002/0050594 A1 May 2, 2002

(Under 37 CFR 1.47)

(30) Foreign Application Priority Data

Oct. 20, 2000 (KR) ........................................ 2000-61931

(51) Int. Cl.[7] .................. G02F 1/1343; G02F 1/1335; G02F 1/1333
(52) U.S. Cl. .................. 349/38; 349/113; 349/162
(58) Field of Search .................... 349/38, 113, 162

(56) References Cited

U.S. PATENT DOCUMENTS

| | | | | |
|---|---|---|---|---|
| 5,724,107 A | * | 3/1998 | Nishikawa et al. | 349/38 |
| 5,771,082 A | * | 6/1998 | Chaudet et al. | 349/39 |
| 5,831,284 A | * | 11/1998 | Park et al. | 257/68 |
| 5,966,190 A | * | 10/1999 | Dohjo et al. | 349/39 |
| 6,034,747 A | * | 3/2000 | Tanaka et al. | 349/43 |
| 6,124,971 A | * | 9/2000 | Ouderkirk et al. | 359/487 |
| 6,362,507 B1 | * | 3/2002 | Ogawa et al. | 257/350 |
| 6,376,270 B1 | * | 4/2002 | Gu et al. | 438/30 |
| 6,404,473 B1 | * | 6/2002 | Kaneko et al. | 349/139 |
| 6,424,012 B1 | * | 7/2002 | Kawasaki et al. | 257/350 |
| 6,433,851 B2 | * | 8/2002 | Shimada et al. | 349/138 |

* cited by examiner

Primary Examiner—T. Chow-hung
Assistant Examiner—Mike Qi
(74) Attorney, Agent, or Firm—McKenna Long & Aldridge LLP

(57) ABSTRACT

Disclosed are a reflective and transflective liquid crystal display device and its manufacturing method, which can raise light efficiency by removing a depressed part in a reflective device without forming a capacitor contact hole in a storage capacitor. The reflective liquid crystal display device includes: a plurality of gate lines and data lines intersecting on a first substrate, the gate line and the data line defining pixel areas; a thin film transistor formed at the intersection of the gate line and the data line, the thin film transistor including a gate electrode, a semiconductor layer, a source electrode and a drain electrode; a capacitor lower electrode of a storage capacitor formed on the same plane as the gate line; an capacitor upper electrode formed integrally with the drain electrode on the capacitor lower electrode; a first insulation film inserted between the capacitor upper electrode and the capacitor lower electrode; and a thin film transistor array substrate connected with the drain electrode and including the reflective electrode formed at the pixel area.

15 Claims, 12 Drawing Sheets

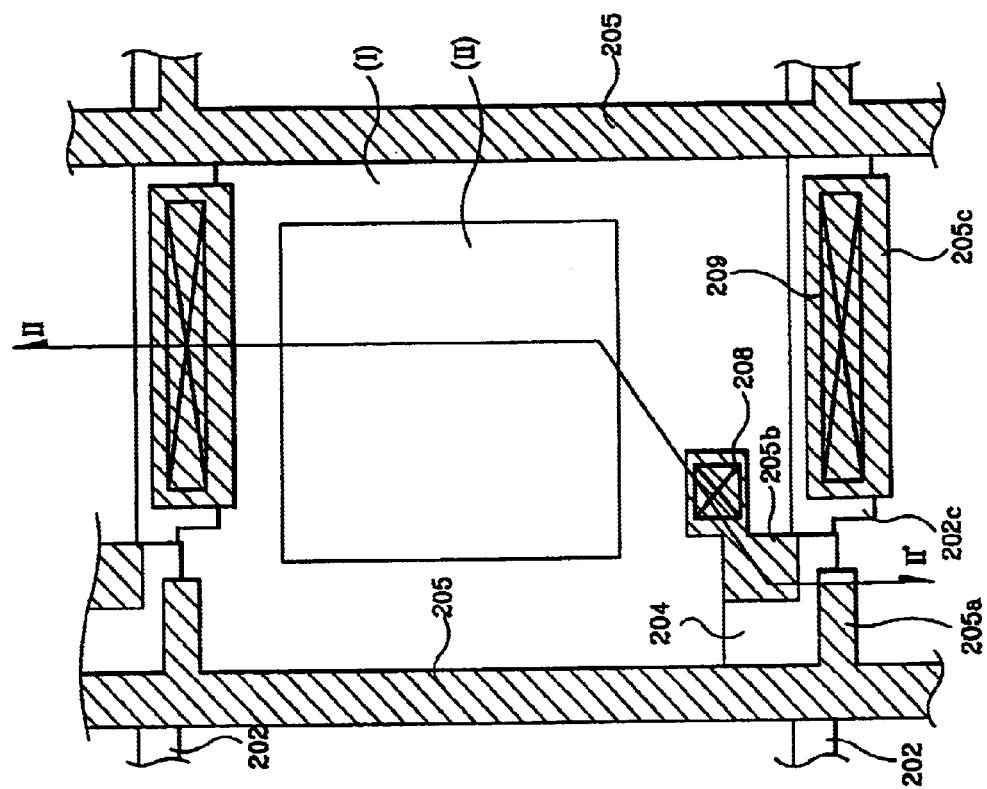

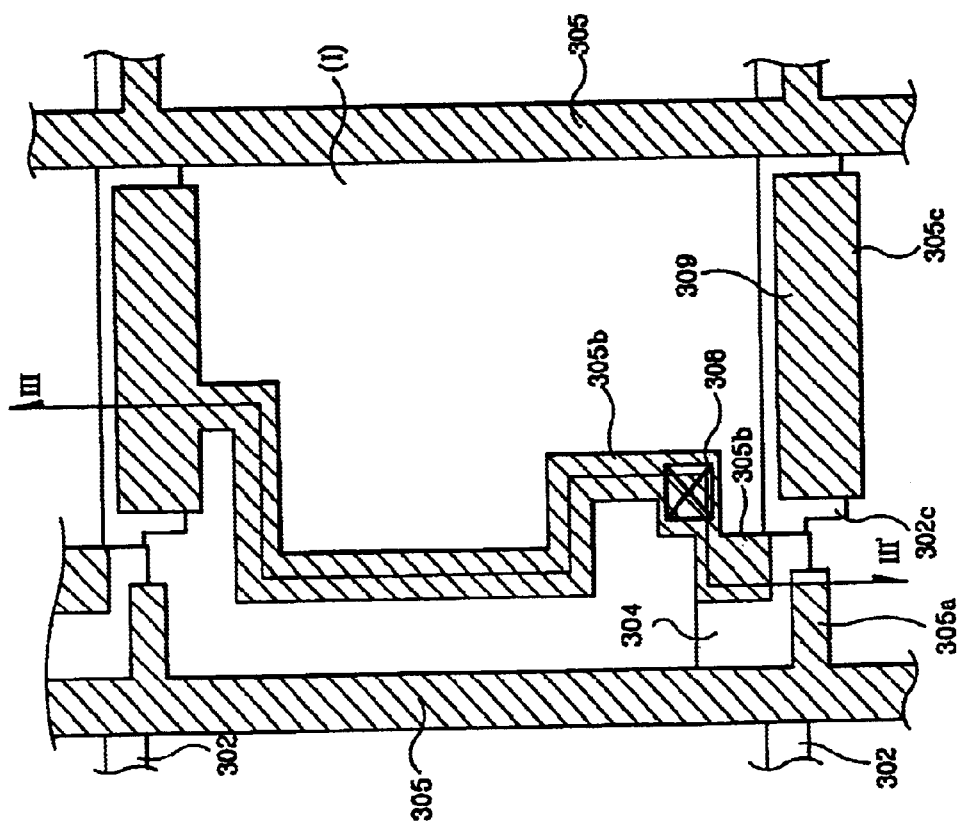

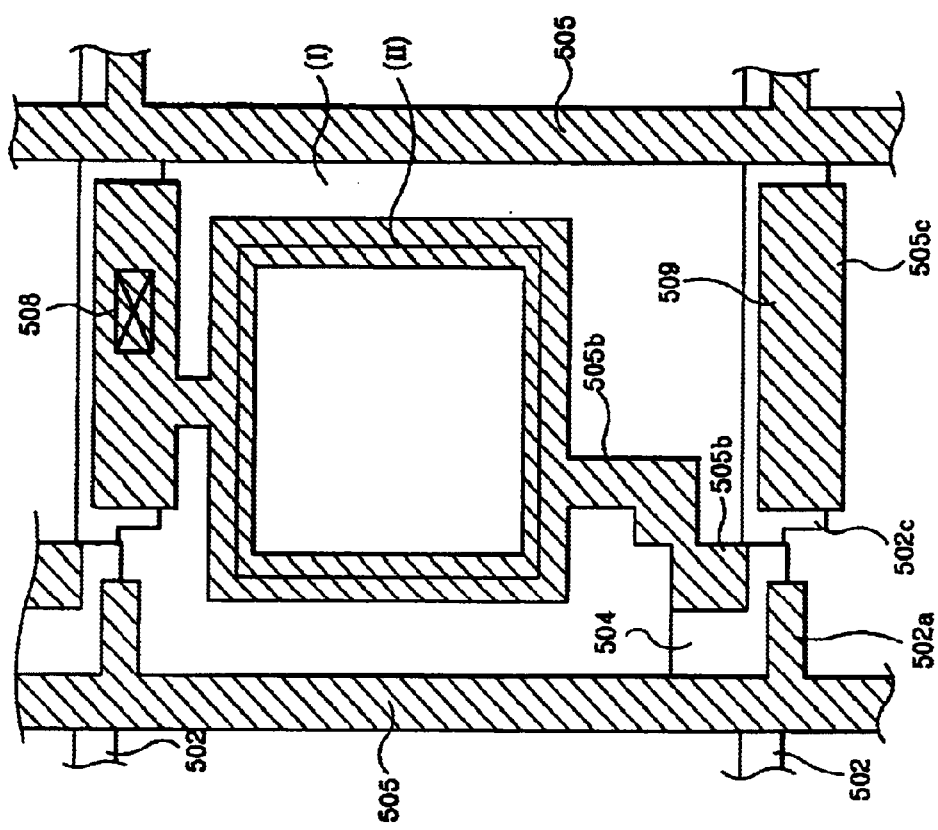

REFLECTIVE AND TRANSFLECTIVE LIQUID CRYSTAL DISPLAY DEVICE AND ITS MANUFACTURING METHOD

This application claims the benefit of Korean Patent Application No. 2000-61931 filed on Oct. 20, 2000, which is hereby incorporated by reference as if fully set forth herein.

BACKGROUND OF THE INVENTION

1. Field of the Invention

The present invention relates to a liquid crystal display device, and more particularly, to a reflective and transflective liquid crystal display device, which has a storage capacitor, and its manufacturing method.

2. Description of the Related Art

In general, a liquid crystal display device is classified into two types, i.e., a transmissive liquid crystal display device using a back light as a light source and a reflective liquid crystal display device using not the back light but a natural light as the light source. The transmissive liquid crystal display device embodies luminous picture using the backlight as the light source even in a dark outside environment. However, the transmissive liquid crystal display device cannot use in a bright place and electricity is largely wasted.

On the other hand, the reflective liquid crystal display device, which does not use the backlight, can reduce largely the power consumption and its volume, thereby achieving a super thin type and lightweight type. However, there are limitations that the reflective liquid crystal display device cannot be used when the outside natural light is dim.

To overcome the above limitations, a transflective liquid crystal display device is disclosed. The transflective liquid crystal display device can be used as a reflective type or a transmissive type at need, as having both a reflection part and a transmission part inside unit pixel.

That is, the transflective liquid crystal display device is operated as the reflective liquid crystal display device by reflecting the outside light incident through a first substrate when the outside natural light is bright to an extent that the display function is capable without the back light. Moreover, when the outside light is not bright, the transflective liquid crystal display device is operated as the transmissive liquid crystal display device by irradiating the light of the back light to a liquid crystal layer through an opening part of a reflective electrode by using the back light.

Meanwhile, the liquid crystal display devices connect parallel a storage capacitor and a liquid crystal capacitor to assist the electric charge conservation capacity. The structure of the liquid crystal display devices is called a previous gate structure, as being formed between a gate and a pixel electrode.

The storage capacitor maintains voltage charged into the liquid crystal capacitor in a turn-off area of a corresponding thin film transistor. Therefore, in the turn-off area, the occurrence of leakage current can be prevented by the liquid crystal capacitor and the deterioration of picture due to the occurrence of flicker can be prevented.

Hereinafter, referring to the drawings, conventional reflective and transflective liquid crystal display device and its manufacturing method will be described.

FIG. 1a is a plan view of a conventional reflective liquid crystal display device and FIG. 1b is a sectional view of the reflective liquid crystal display device showing a cut surface along the line of I–I' of FIG. 1a. FIG. 2a is a plan view of a conventional transflective liquid crystal display device and FIG. 2b is a sectional view of the transflective liquid crystal display device showing a cut surface along the line of II–II' of FIG. 2a.

In general, the liquid crystal display device includes a lower substrate called an aligning substrate of the thin film transistor, an upper substrate called a color filter substrate, and a liquid crystal layer formed between the two substrates. Hereinafter, the aligning substrate of the thin film transistor, which is the lower substrate, of the liquid crystal display device will be described.

First, as shown in FIGS. 1a and 1b, the lower substrate of the reflective liquid crystal display includes a data line 105 and a gate line 102, which are aligned on a substrate 101 in the form of a matrix to define the unit pixel, a thin film transistor having a gate electrode 102a formed at an intersection between the data line 105 and the gate line 102, a gate insulation film 103, an semiconductor layer 104, source/drain electrodes 105a and 105b, a reflective electrode 107 electrically connected to the drain electrode 105b of the thin film transistor and occupying most of unit pixel area, and a storage capacitor having a capacitor lower electrode 102c and an capacitor upper electrode 105c electrically connected to the reflective electrode 107.

In detail, the gate line 102, the gate electrode 102a of the thin film transistor and the capacitor lower electrode 102c of the storage capacitor are formed by patterning simultaneously after depositing metal of low resistance by a sputtering method.

Furthermore, also the data line 105, the source/drain electrodes 105a and 105b of the thin film transistor and the capacitor upper electrode 105c of the storage capacitor are formed by patterning simultaneously after depositing conductive material of low resistance by the sputtering method.

At this time, on the entire surface of the substrate including the gate line 102, the gate electrode 102a and the capacitor lower electrode 102c is the gate insulation film 103 of silicon nitride ($SiN_x$) film to insulate upper and lower layers, and an semiconductor layer 104 of an island form between the gate insulation film 103 and the source/drain electrodes 105a and 105b. On the entire surface of the substrate including the data line 105, the source/drain electrodes 105a and 105b and the capacitor upper electrode 105c is a passivation film 106 coated in a prescribed thickness.

The passivation film 106 has a pixel contact hole 108 of a prescribed depth and a capacitor contact hole 109 of a prescribed depth exposing a portion of the drain electrode 105b and a portion of the capacitor upper electrode 105c respectively. There is a reflective electrode 107 covering the contact holes at the unit pixel area on the passivation film. At this time, the reflective electrode has a depressed part in the contact hole.

The pixel contact hole 108 electrically connects the drain electrode 105b and the reflective electrode 107 and the capacitor contact hole 109 connects the reflective electrode 107 and the capacitor upper electrode 105c.

The reflective electrode 107 is formed to occupy most of the unit pixel area constituted with only a reflection part(I) and made of metal having high reflectance, such as copper (Cu), chrome(Cr), Aluminum(Al), molybdenum(Mo), chrome/molybdenum(Cr/Mo) and chrome/aluminum(Cr/Al). The reflective electrode of the reflective liquid crystal display is important as being closely connected with brightness of picture. The transflective liquid crystal display further includes a transmission part(II) on the reflective liquid crystal display.

That is, as shown in FIGS. 2a and 2b, the transflective liquid crystal display includes a data line 205 and a gate line 202 aligned in the form of a matrix on a substrate 201, a thin film transistor formed on an intersection between the data line 205 and the gate line 202, a storage capacitor formed at a prescribed portion of the gate line, a first passivation film 206a formed on the thin film transistor and the storage capacitor, a reflective electrode 207a electrically connected with the thin film transistor and formed on the reflective part(I) of the unit pixel area, a second passivation film 206b formed on the entire surface including the reflective electrode 207a, and a transmissive electrode 207b formed on the transmission part(II) on the second passivation film 206b.

At this time, the transmissive electrode 207b is made of ITO(Indium Tin Oxide), which is a transparent conductive material. The reflective electrode 207a is made of metal having a reflectance, such as copper(Cu), chrome(Cr), Aluminum(Al), molybdenum(Mo), chrome/molybdenum (Cr/Mo) and chrome/aluminum(Cr/Al), to reflect the outside light well. The transmissive electrode 207b and the reflective electrode 207a are connected with each other to form a pixel electrode 207.

In detail, the thin film transistor has a laminated film structure and includes a gate electrode 202a connected to the gate line 202, a gate insulation film 203, which is made of silicon nitride ($SiN_x$), formed on the entire surface including the gate line 202, an semiconductor layer 204 made of amorphous silicon, and source/drain electrodes 205a and 205b connected to the data line 205. A reflective electrode 207a, which will be formed later, is electrically connected with the drain electrode through a pixel contact hole 208 formed by removing the first passivation film on the drain electrode 205b. As a result, a voltage according to the on-off action of the thin film transistor is applied to the reflective electrode 207a.

The storage capacitor includes a capacitor lower electrode 202c, which is a portion of the gate line 202, an capacitor upper electrode 205c of an island form formed simultaneously with the data line 205, and a gate insulation film 203 interposed between the capacitor lower electrode 202c and the capacitor upper electrode 205c. The capacitor upper electrode 205c, which is formed in the island shape, is electrically connected with a pixel electrode 207 to impress voltage.

Such voltage impression is possible by connecting the pixel electrode 207 on the first passivation film 206a and the capacitor upper electrode 205c through a capacitor contact hole 209 formed by selectively removing the first passivation film 206a on the capacitor upper electrode 205c. At this time, the pixel electrode, i.e., the reflective electrode formed in the capacitor contact hole has a depressed part corresponding to a depth of the capacitor contact hole.

The transflective liquid crystal display constructed as the above transmits voltage impressed on the pixel electrode 207 through the drain electrode 205b to the capacitor upper electrode 205c connected through the capacitor contact hole 209, thereby forming capacitance between the upper and capacitor lower electrodes 205c and 202c.

However, the conventional reflective and transflective liquid crystal display device and its manufacturing method have the following problems.

In case of forming the storage capacitor of the reflective and transflective liquid crystal display, when the capacitor upper electrode and the pixel electrode on the passivation film are connected with each other through the capacitor contact hole formed by removing the passivation film, a portion of the pixel electrode is depressed by the contact hole, and the retardation because of a cell gap difference by the depressed portion is increased more than a design value, thereby lowering an optical efficiency.

Particularly, if a thick passivation film is used to enlarge the cell gap of the transmission part of the transflective liquid crystal display, the capacitor contact hole is depressed more, thereby lowering the optical efficiency more.

SUMMARY OF THE INVENTION

It is, therefore, an object of the present invention to provide a reflective and transflective liquid crystal display device, which does not have a depressed part of a reflective electrode by removing a capacitor contact hole, and its manufacturing method.

To achieve the above objects, the present invention provides a reflective liquid crystal display device including: a plurality of gate lines and data lines intersecting on a first substrate, the gate line and the data line defining pixel areas; a thin film transistor formed at the intersection of the gate line and the data line, the thin film transistor including a gate electrode, a semiconductor layer, a source electrode and a drain electrode; a capacitor lower electrode of a storage capacitor formed on the same plane as the gate line; an capacitor upper electrode formed integrally with the drain electrode on the capacitor lower electrode; a first insulation film inserted between the capacitor upper electrode and the capacitor lower electrode; and a thin film transistor array substrate connected with the drain electrode and including the reflective electrode formed at the pixel area.

Moreover, the present invention provides a transflective liquid crystal display device, which has pixel areas defined into a reflection part and a transmission part, the liquid crystal display device including: a plurality of gate lines and data lines intersecting on a first substrate, the gate line and the data line defining pixel areas; a thin film transistor formed at the intersection of the gate line and the data line, the thin film transistor including a gate electrode, a semiconductor layer, a source electrode and a drain electrode; a capacitor lower electrode of a storage capacitor formed on the same plane as the gate line; an capacitor upper electrode formed integrally with the drain electrode on the capacitor lower electrode; a first insulation film inserted between the capacitor upper electrode and the capacitor lower electrode; a reflective electrode connected with the drain electrode and formed on the reflection area; and a thin film transistor array substrate connected with the reflective electrode and including the transmissive electrode formed at the transmission area.

According to the present invention, to prevent the reduction of the optical efficiency in the reflection part on the storage capacitor, the reflective and transflective liquid crystal display impresses electric field by connecting the drain electrode and the capacitor upper electrode with each other without forming the contact hole for connecting the capacitor upper electrode and the pixel electrode.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

Moreover, in case of the transflective liquid crystal display, light leakage can be prevented by covering a boundary part between the transmission part and the reflection part, where the light leakage occurs.

BRIEF DESCRIPTION OF THE DRAWINGS

Further objects and advantages of the invention can be more fully understood from the following detailed description taken in conjunction with the accompanying drawings in which:

FIG. 1b is a sectional view of the reflective liquid crystal display device taken along the line of I–I' of FIG. 1a;

FIG. 2a is a plan view of a conventional transflective liquid crystal display device;

FIG. 2b is a sectional view of the transflective liquid crystal display device taken along the line of II–II' of FIG. 2a;

FIG. 3a is a plan view of a reflective liquid crystal display device according to the present invention;

FIG. 3b is a sectional view of the reflective liquid crystal display device taken along the line of III–III' of FIG. 3a;

FIG. 4b is a sectional view of the transflective liquid crystal display device taken along the line of IV–IV' of FIG. 4a;

FIG. 8 is an alternative embodiment to FIG. 5.

DETAILED DESCRIPTION OF THE PREFERRED EMBODIMENT

Figure 1A:
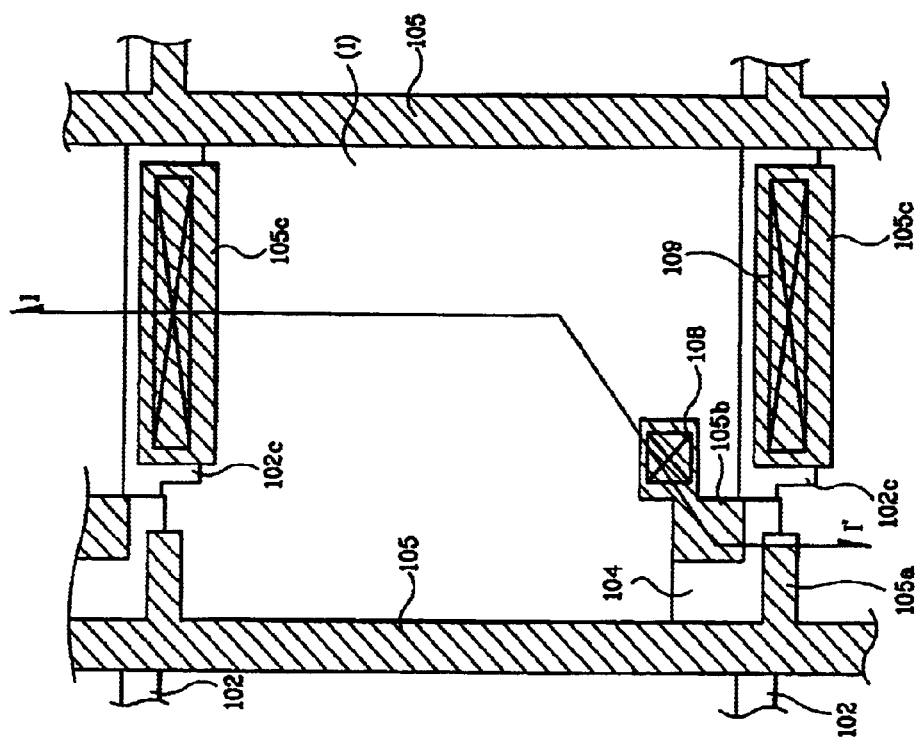
FIG. 1a is a plan view of a conventional reflective liquid crystal display device.
Figure 1B:
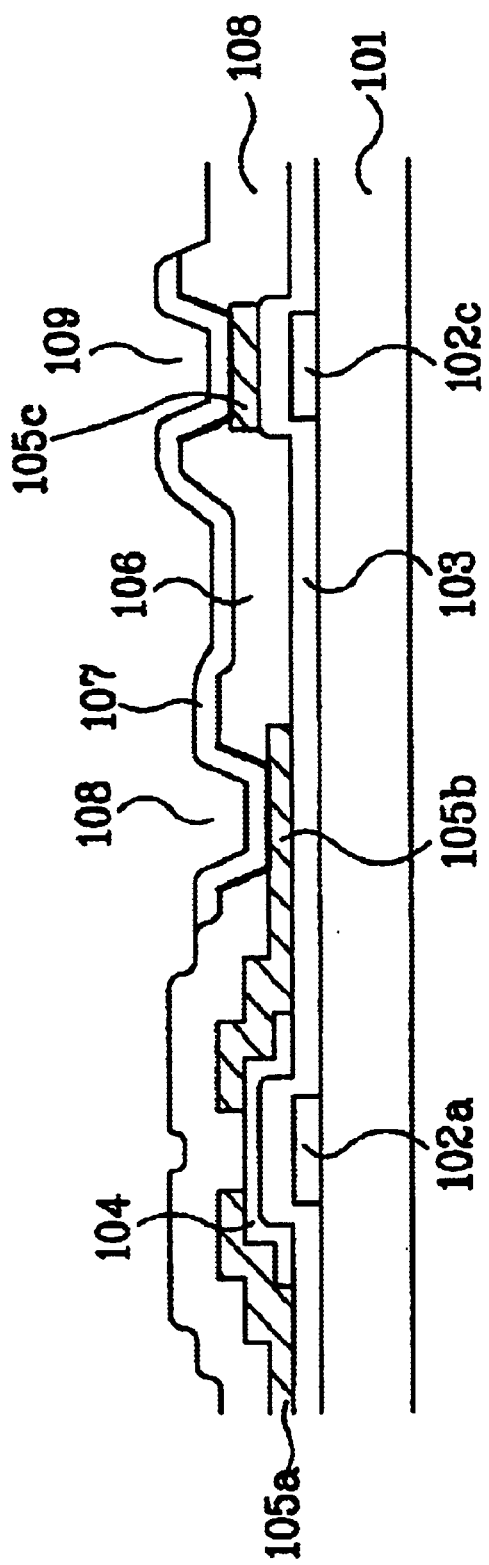
Figure 2B:
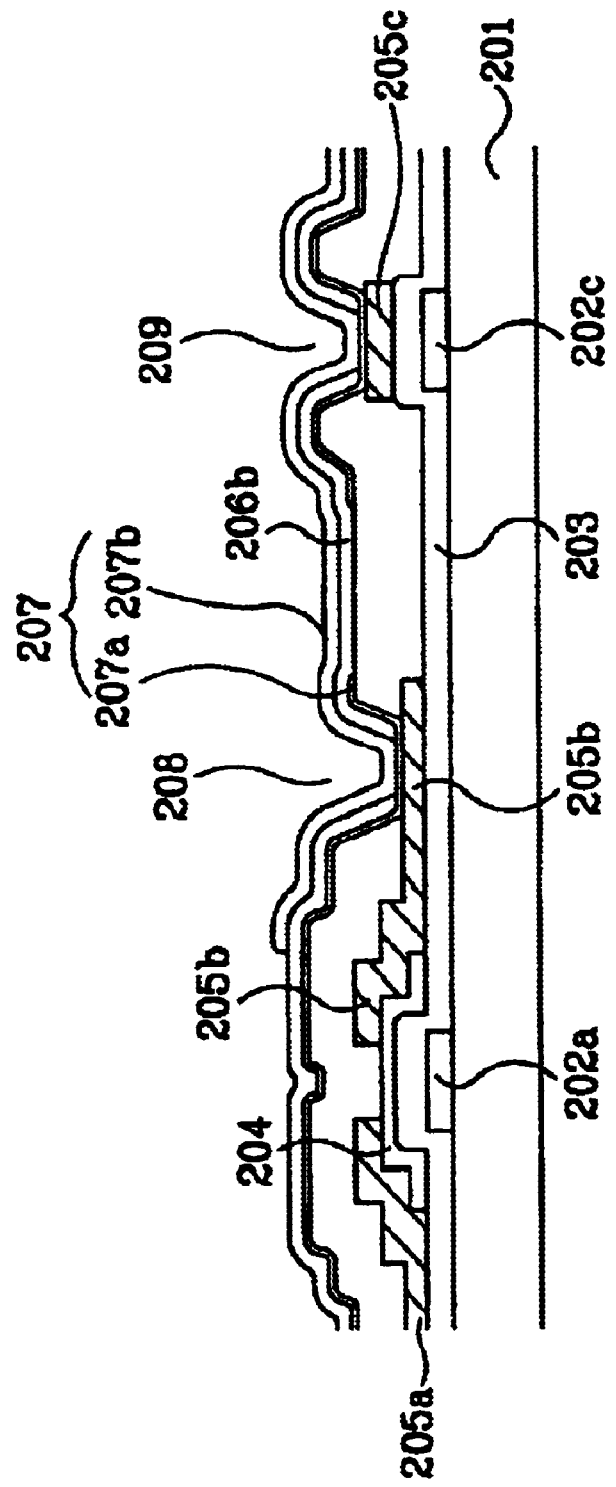

The present invention will now be described in detail in connection with preferred embodiments with reference to the accompanying drawings. For reference, like reference characters designate corresponding parts throughout several views.

Hereinafter, referring to the drawings, a reflective and transflective liquid crystal display device and its manufacturing method will be described in detail.

Figure 3B:
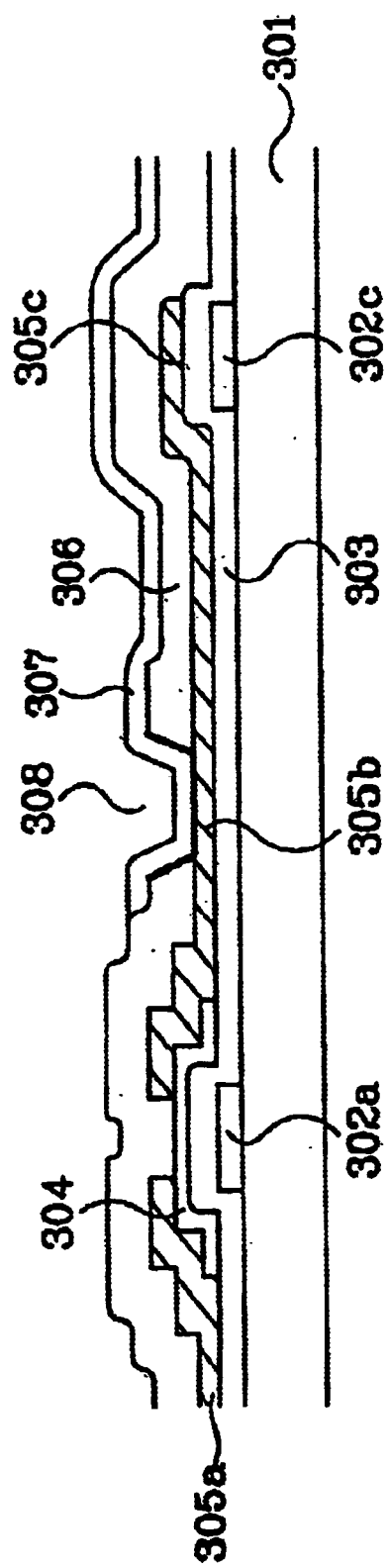
Figure 4A:
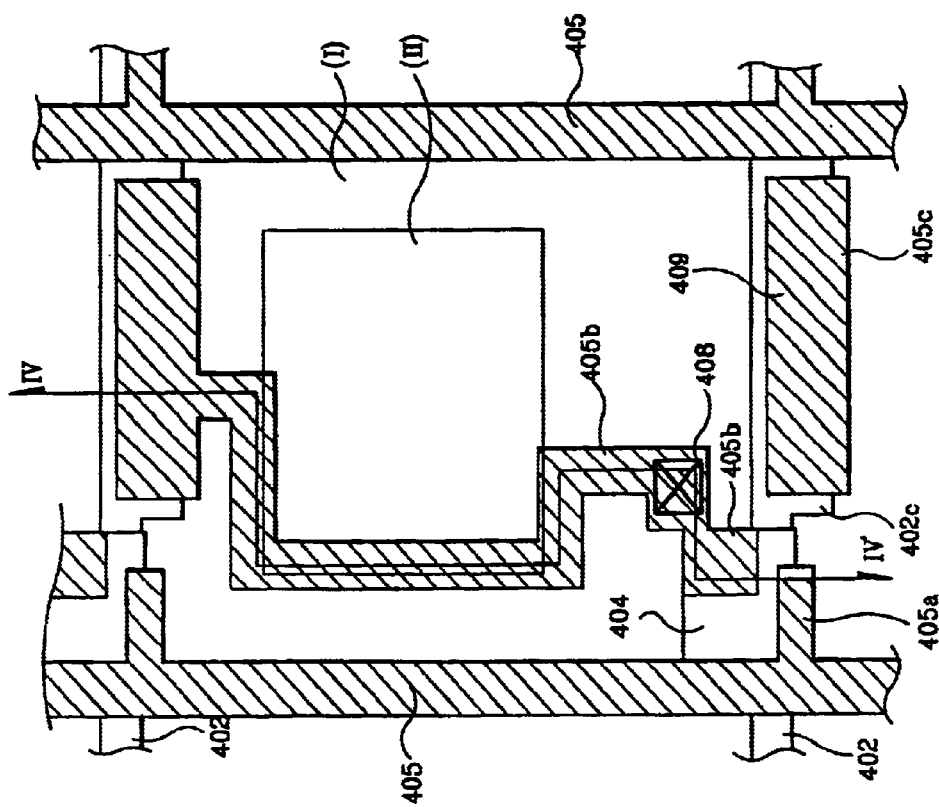
FIG. 4a is a plan view of a transflective liquid crystal display device according to the present invention.
Figure 4B:
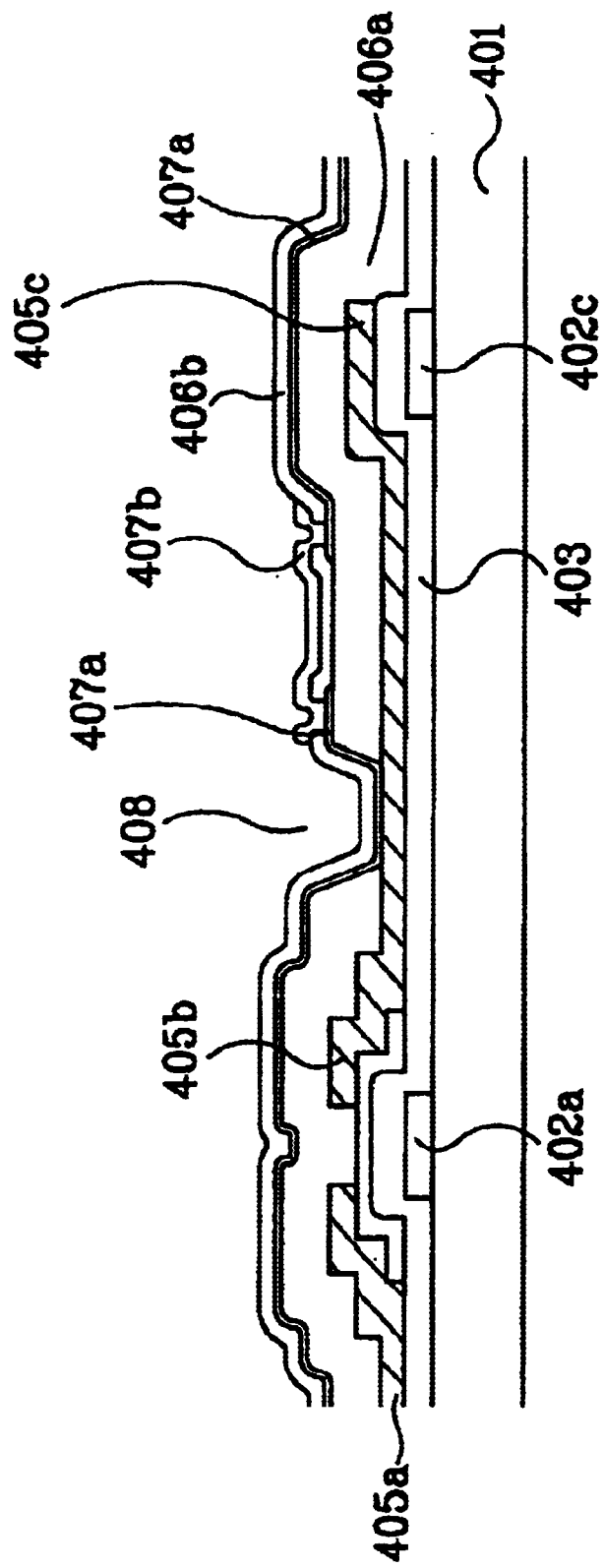

FIG. 3a is a plan view of a reflective liquid crystal display device according to the present invention and FIG. 3b is a sectional view of the reflective liquid crystal display device showing a cut surface taken along the line of III–III' of FIG. 3a. FIG. 4a is a plan view of a transflective liquid crystal display device according to the present invention and FIG. 4b is a sectional view of the transflective liquid crystal display device showing a cut surface taken along the line of IV–IV' of FIG. 4b.

As shown in FIGS. 3a and 3b, the lower substrate of the reflective liquid crystal display according to the present invention includes a gate line 302 deposited and patterned on a substrate 301, a gate electrode 302a and a capacitor lower electrode 302c formed simultaneously with the gate line, a gate insulation film 303 formed on the entire surface including the gate line, a data line 305 located at right angles to the gate line and defining unit pixel, a source electrode 305a and a drain electrode 305b formed simultaneously with the data line, an capacitor upper electrode 305c formed integrally with the drain electrode 305b and formed on the adjacent gate line 302, a passivation film 306 formed thick on the entire surface including the data line, a reflective electrode 307 formed on the passivation film 306 of the reflection part (I) of unit pixel, and a pixel contact hole 308 formed by selectively removing the passivation film 306 to electrically connect the reflective electrode and the drain electrode 205b.

At this time, the capacitor lower electrode 302c, the gate insulation film 303 and the capacitor upper electrode 305c form a storage capacitor. A laminated structure consisting of the gate electrode 302a, the gate insulation film 303, a semiconductor layer 304 and the source/drain electrodes 305a and 305b forms a thin film transistor. An a-Si:H TFT (amorphous Silicon Thin Film Transistor) having the semiconductor layer 304 made of amorphous silicon is the main current.

The gate line 302, the gate electrode 302a, the capacitor lower electrode 302c, the data line 305, the source electrode 305a, the drain electrode 305b and the capacitor upper electrode 305c are patterned after deposited by the sputtering method using chrome(Cr), molybdenum(Mo), aluminum (Al), tin(Sn) and copper(Cu).

As described above, the drain electrode and the capacitor upper electrode may be patterned integrally, thereby not requiring additional process and not having an influence on performance of the device and reflectance as being located on a lower portion of the reflective electrode 307 made of aluminum or aluminum alloy.

The capacitor upper electrode, in case of reflective type, is formed to have the shortest length at the lower portion of the reflective electrode. Furthermore, the gate insulation film 303 can use inorganic insulation material, such as silicone nitride or silicone oxide, or organic insulation material such as BCB (Benzocyclobutene) or acrylic resin.

The passivation film 306 is to protect various lines and electrodes formed on the substrate. The passivation film according to the present invention is formed relatively thick to prevent an RC delay to the pixel electrode.

As shown in FIGS. 4a and 4b, the lower substrate of the transflective liquid crystal display includes gate lines 402 aligned parallel on the substrate in a fixed interval, a gate electrode 402a connected to the gate line 402 and formed on the position of the thin film transistor, a capacitor lower electrode 405c formed on the position of the storage capacitor, a gate insulation film 403 formed on the entire surface including the gate lines for electrically insulating the gate lines, the gate electrodes and a capacitor lower electrode from the upper layer, a data line 405 formed on the gate insulation film and having a matrix structure with the gate lines 402, a source electrode 405a and a data electrode 405b deposited with the same material as the data line and patterned simultaneously, an capacitor upper electrode 405c formed integrally with the data electrode 405b and opposed to the capacitor lower electrode 402c, a semiconductor layer 404 formed between the gate insulation film 403 on the gate electrode and the source/drain electrodes 405a and 405b to form an active layer, a first passivation film 406a formed thick on the entire surface including the data line, a reflective electrode 407a formed on the first passivation film 406a of the reflection part (I) of unit pixel, a pixel contact hole 408 formed by selectively removing the first passivation film 406a to electrically contact the drain electrode 405b and the reflective electrode 407a, a second passivation film 406b formed on the reflective electrode 407a, and a transmissive electrode 407b formed on the transmission part (II) by contacting with the reflective electrode through a prescribed portion where the second passivation film is removed.

At this time, the reflective electrode 407a and the transmissive electrode 407b form a pixel electrode 407. The second passivation film 406b, which is a layer insulation film, is to electrically divide the reflective electrode and the transmissive electrode.

The transmissive electrode 407b uses ITO(Indium Tin Oxide) mixed with stannic oxide of about 5%. The reflective electrode 407a uses aluminum, aluminum alloy and titanium (Ta) having high reflectance. The second passivation film 406b is an insulation film and uses silicon nitride, silicon oxide, BCB or acrylic resin.

Moreover, the semiconductor layer 404 is deposited by a PECVD (Plasma Enhanced Chemical Vapor Deposition) method using amorphous silicone (a-Si). The gate line, the gate electrode, the capacitor lower electrode, the data line, the source electrode and integrated drain electrode and capacitor upper electrode are deposited by the sputtering method using metal, such as copper, aluminum, aluminum alloy, having conductivity and low resistance, and after that, patterned.

Particularly, the integrated drain electrode 405b and capacitor upper electrode 405c must be designed not to generate crosstalk phenomenon to the source electrode 405a and aligned to cover a boundary part of the reflective part (I) and the transmissive part (II).

In the transflective liquid crystal display, there may be a leakage of light from the backlight at the boundary part of the reflective part and the transmission part. For reference, the light leaking at the boundary part between the reflective part and the transmissive part is influenced by a rubbing direction of an alignment layer.

Figure 5:
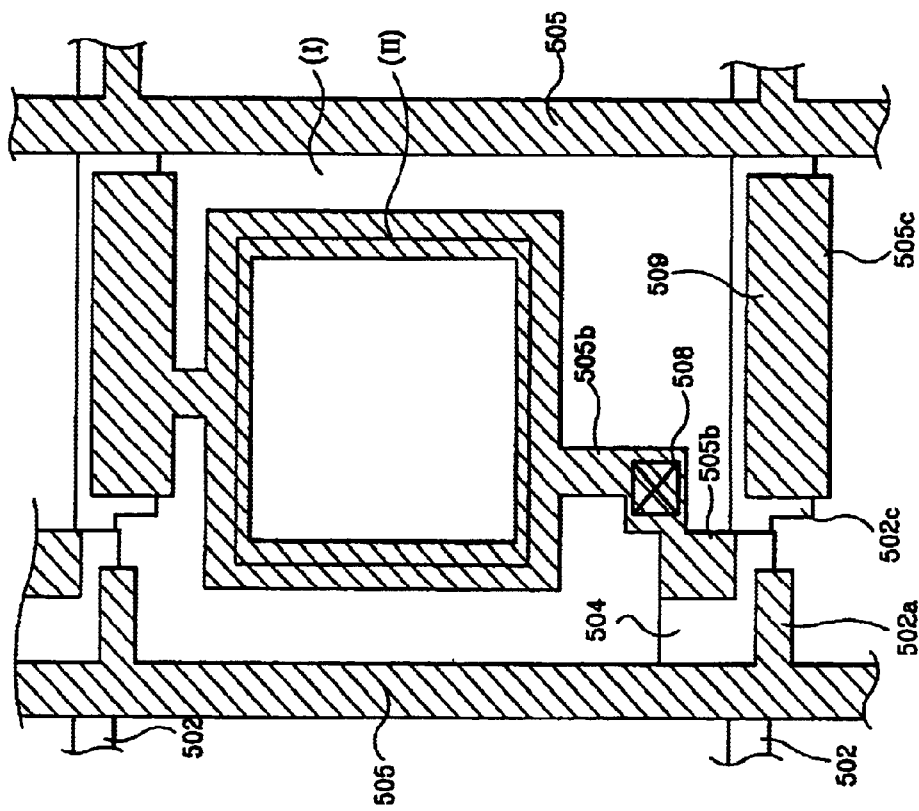
FIG. 5 is a plan view of a transflective liquid crystal display device according to another embodiment of the present invention.

As shown in FIG. 5, the capacitor upper electrode 405c may be formed at two parts to cover all boundary part where the light is leaked.

Figure 6:
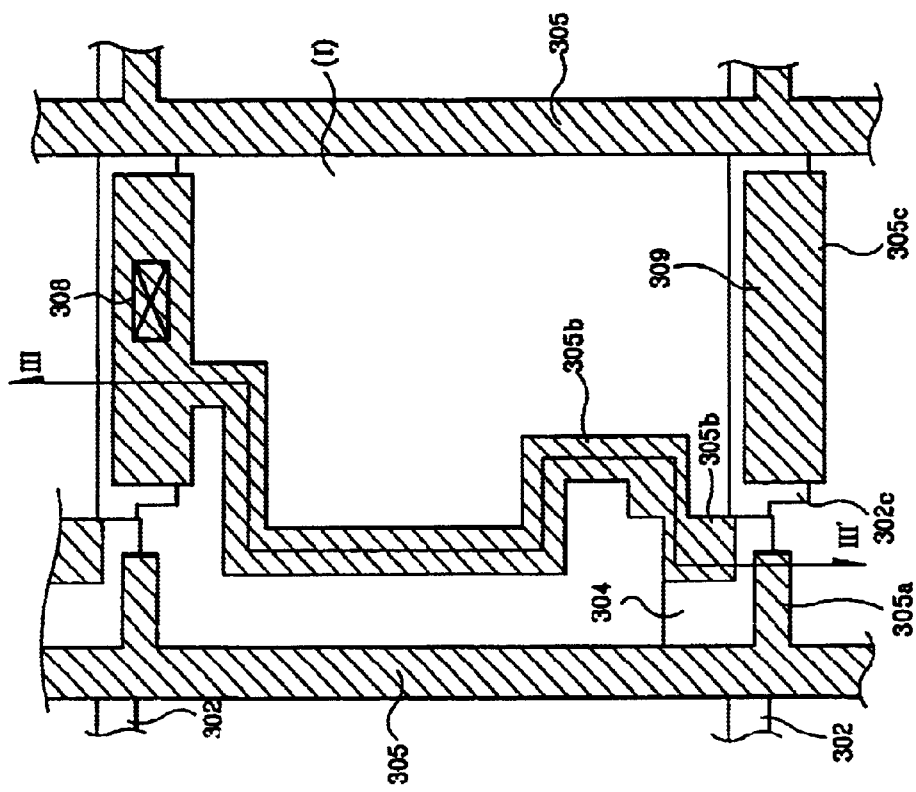
FIG. 6 is an alternative embodiment to FIG. 3A.
Figure 7:
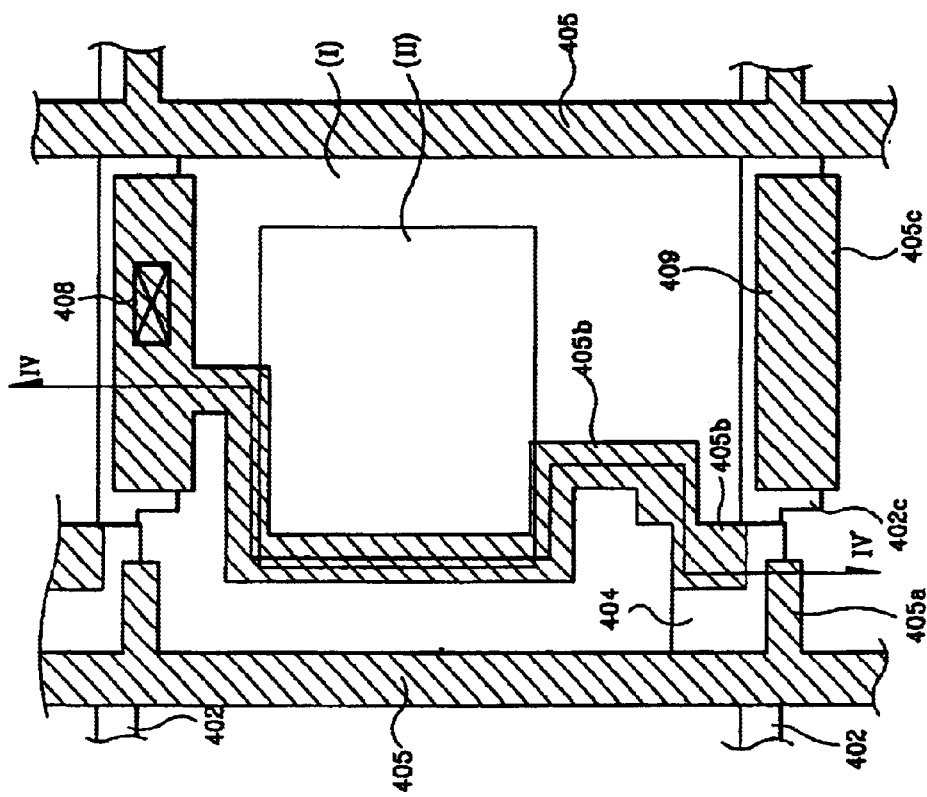
FIG. 7 is an alternative embodiment to FIG. 4A.

FIGS. 6, 7 and 8 are alternative embodiments of FIGS. 3A, 4A and 5, respectively. Each of FIGS. 6, 7 and 8 have the respective pixel contact hole 308, 408 and 508 at the storage capacitor side rather than at the drain electrode.

The reflective and transflective liquid crystal display and its manufacturing method according to the present invention have the following effects.

First, in case of the reflective and transflective liquid crystal display, by forming integrally the capacitor upper electrode and the drain electrode, the capacitor contact hole is not required and a lowering of light efficiency in the capacitor contact hole due to the depression of the pixel electrode can be prevented.

Second, in case of the transflective liquid crystal display, by covering the boundary part between the transmission part and the reflection part with the capacitor upper electrode, the leakage of light can be prevented.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A reflective liquid crystal display device comprising:
   a plurality of gate lines and data lines intersecting on a substrate, the gate lines and the data lines defining pixel areas;
   a plurality of thin film transistors formed at the intersections of the gate lines and the data lines, each thin film transistor including a gate electrode, a semiconductor layer, a source electrode and a drain electrode;
   a capacitor lower electrode of a storage capacitor formed on the same plane as a gate line;
   a capacitor upper electrode formed integrally with the drain electrode on the capacitor lower electrode;
   a gate insulation film between the capacitor upper electrode and the capacitor lower electrode;
   a passivation film on the capacitor upper electrode; and
   a reflective electrode formed over the passivation film at the pixel areas and electrically connected to the drain electrode through a contact hole in the passivation film, wherein the passivation film is between the capacitor upper electrode and the reflective electrode whereby a depression at a pixel electrode is improved.

2. The reflective liquid crystal display as claimed in claim 1, wherein the gate insulation film is one of silicone nitride (SiNx) and silicone oxide(SiOx).

3. The reflective liquid crystal display as claimed in claim 1, wherein the passivation film is one of silicone nitride (SiNx), BCB and acryl resin.

4. The reflective liquid crystal display as claimed in claim 1, wherein the gate electrode and the capacitor upper electrode are metal.

5. The reflective liquid crystal display as claimed in claim 4, wherein the gate electrode is selected from the group consisting of chrome, molybdenum, aluminum, tin, copper and combinations thereof.

6. The reflective liquid crystal display as claimed in claim 4, wherein the capacitor upper electrode is aluminum or aluminum alloy.

7. A transflective liquid crystal display device, which has pixel areas defined into a reflection part and a transmission part, the liquid crystal display device comprising:
   a plurality of gate lines and data lines intersecting on a substrate, the gate lines and the data lines defining pixel areas;
   a plurality of thin film transistors formed at the intersections of the gate lines and the data lines, each thin film transistor including a gate electrode, a semiconductor layer, a source electrode and a drain electrode;
   a capacitor lower electrode of a storage capacitor formed on the same plane as a gate line;
   a capacitor upper electrode formed integrally with the drain electrode on the capacitor lower electrode;
   a gate insulation film inserted between the capacitor upper electrode and the capacitor lower electrode;
   a first passivation film on the capacitor upper electrode; and
   a reflective electrode electrically connected with the drain electrode through a contact hole in the first passivation film and formed over the first passivation film at the reflection part, the passivation film being between the capacitor upper electrode and the reflective electrode;
   wherein the pixel areas include the transmissive electrode formed at the transmission part whereby a depression at a pixel electrode is improved.

8. The transflective liquid crystal display device as claimed in claim 7, wherein the capacitor upper electrode extends along a boundary part between the reflective electrode and the transmissive electrode to prevent light leakage.

9. The transflective liquid crystal display device as claimed in claim 7, wherein the gate insulation film is one of silicone nitride(SiNx) and silicon oxide(SiOx).

10. The transflective liquid crystal display device as claimed in claim 7, wherein the second insulation film is one of silicon nitride (SiNx), BCB or acryl resin.

11. The transflective liquid crystal display device as claimed in claim 7, further comprising a second passivation film between the reflective electrode and the transmissive electrode.

12. The transflective liquid crystal display device as claimed in claim 7, wherein the gate electrode and the capacitor upper electrode are metal.

13. The transflective liquid crystal display device as claimed in claim 12, wherein the gate electrode is selected from the group consisting of chrome, molybdenum, aluminum, tin, copper and combinations thereof.

14. The transflective liquid crystal display device as claimed in claim 12, wherein the capacitor upper electrode is aluminum or aluminum alloy.

15. The transflective liquid crystal display device as claimed in claim 7, wherein the reflective electrode is electrically connected to the transmissive electrode through the second passivation film.

* * * * *